Nov. 3, 1959  G. H. YELINEK  2,910,814
METHOD OF MANUFACTURE OF FILTER MECHANISM
Filed Aug. 12, 1952  6 Sheets-Sheet 1
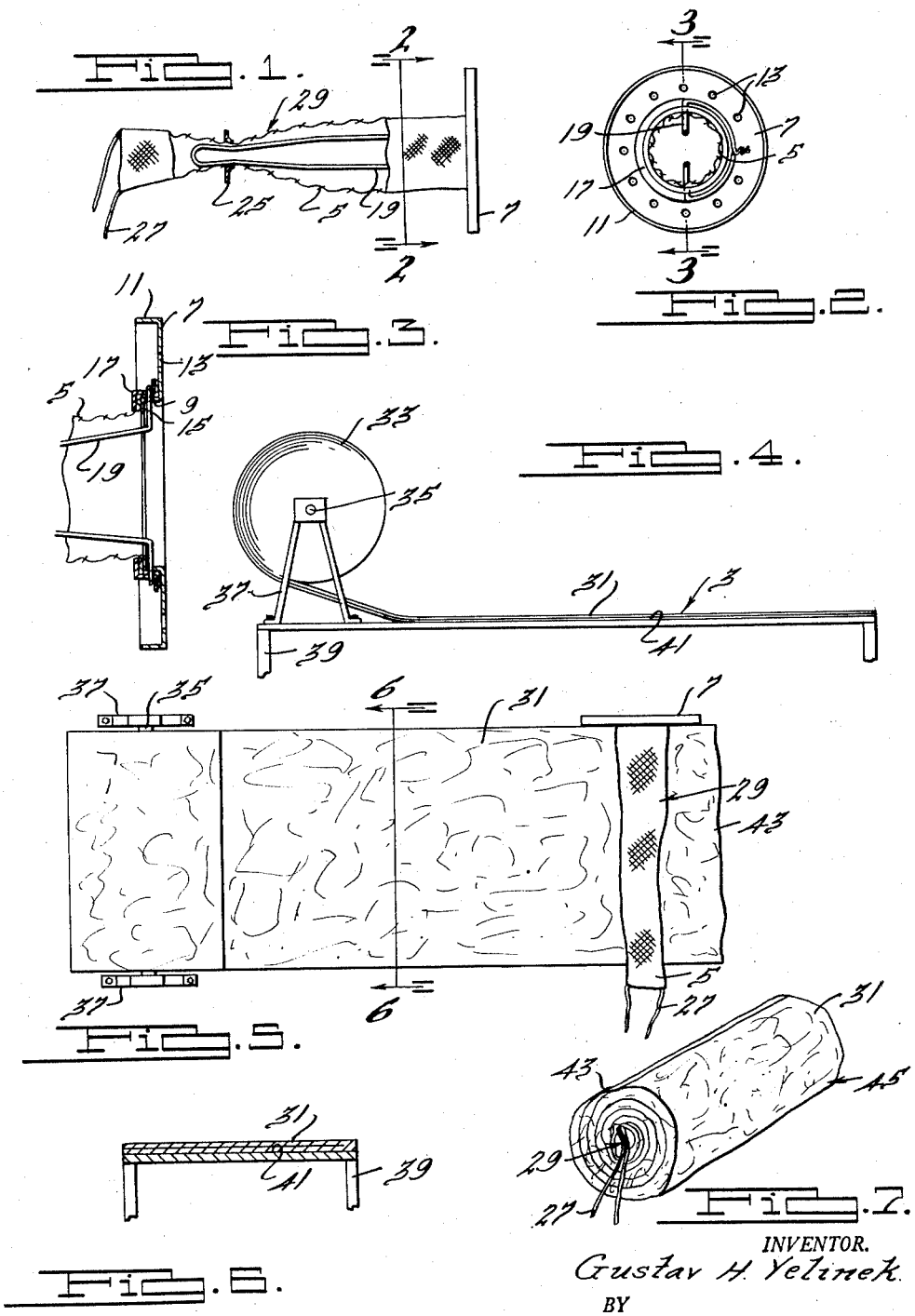
INVENTOR.
Gustav H. Yelinek
BY
Harness, Dickey & Pierce
ATTORNEYS

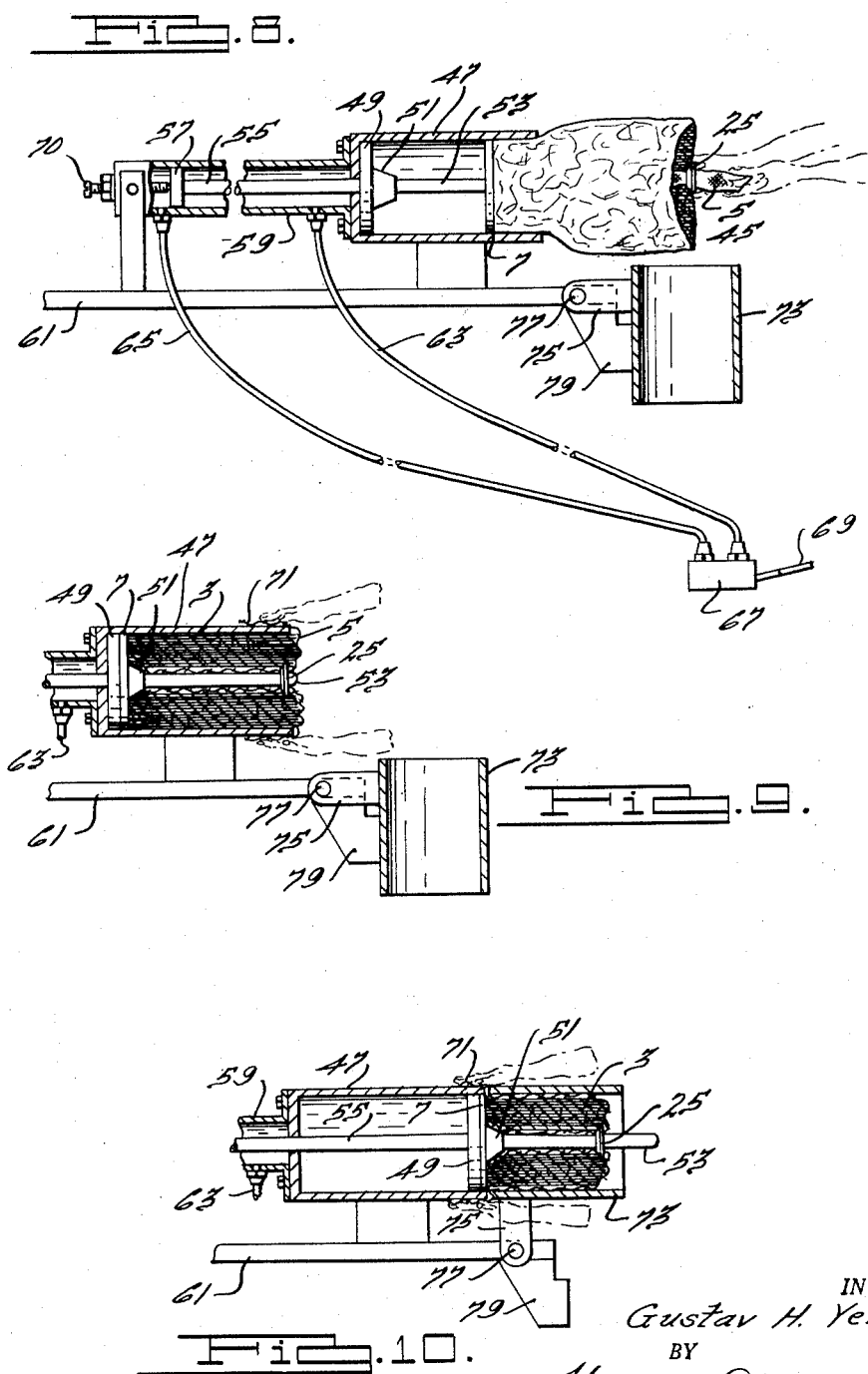

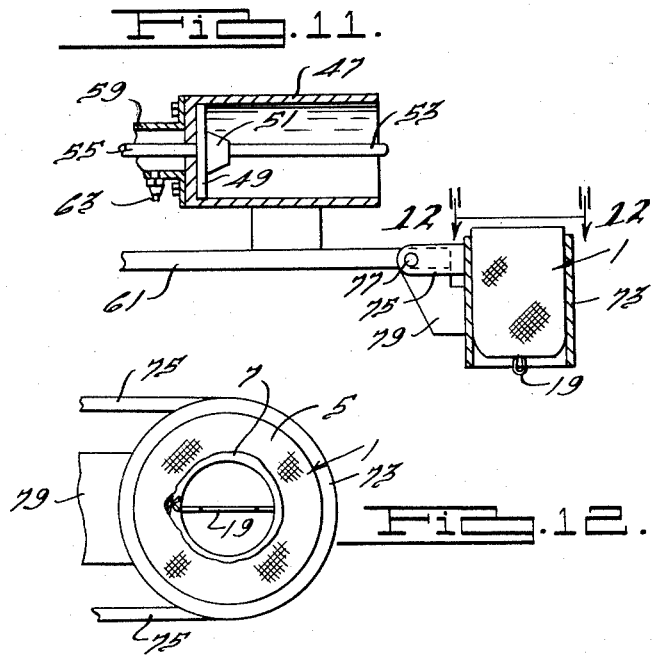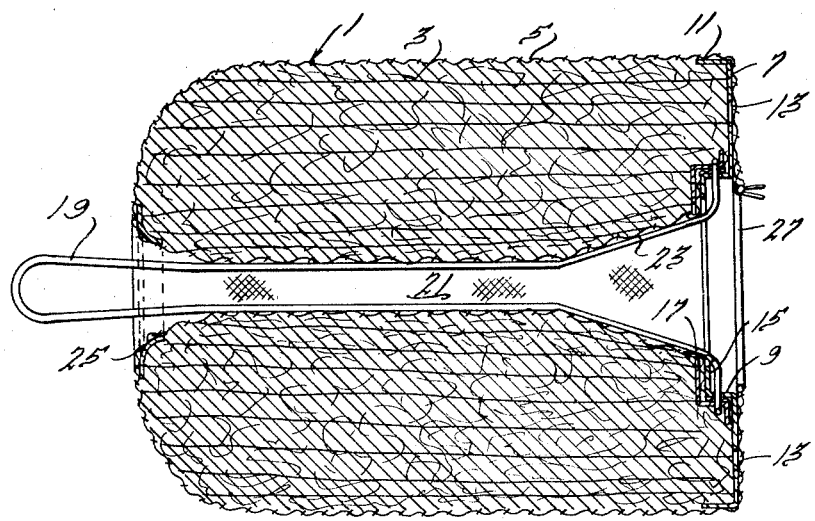

Nov. 3, 1959 G. H. YELINEK 2,910,814
METHOD OF MANUFACTURE OF FILTER MECHANISM
Filed Aug. 12, 1952 6 Sheets-Sheet 4
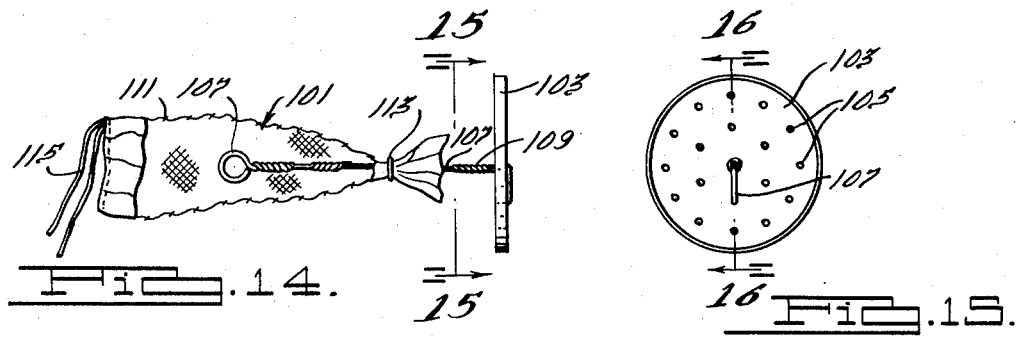
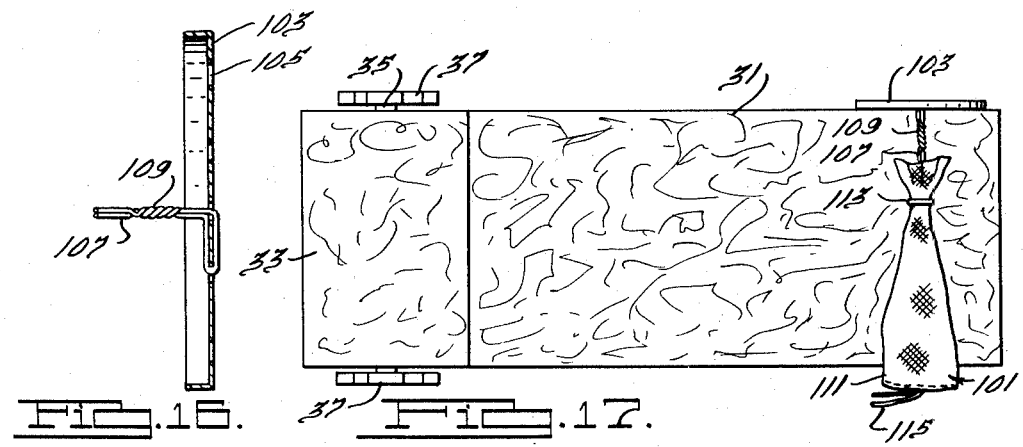
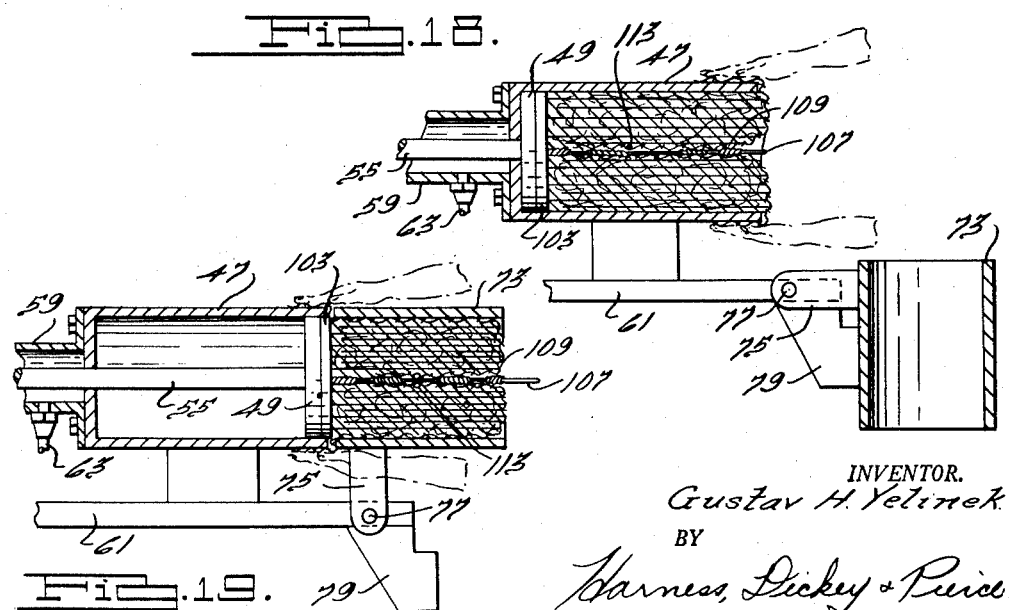
INVENTOR.
Gustav H. Yelinek
BY
Harness, Dickey & Pierce
ATTORNEYS.

Nov. 3, 1959 G. H. YELINEK 2,910,814
METHOD OF MANUFACTURE OF FILTER MECHANISM
Filed Aug. 12, 1952 6 Sheets-Sheet 5
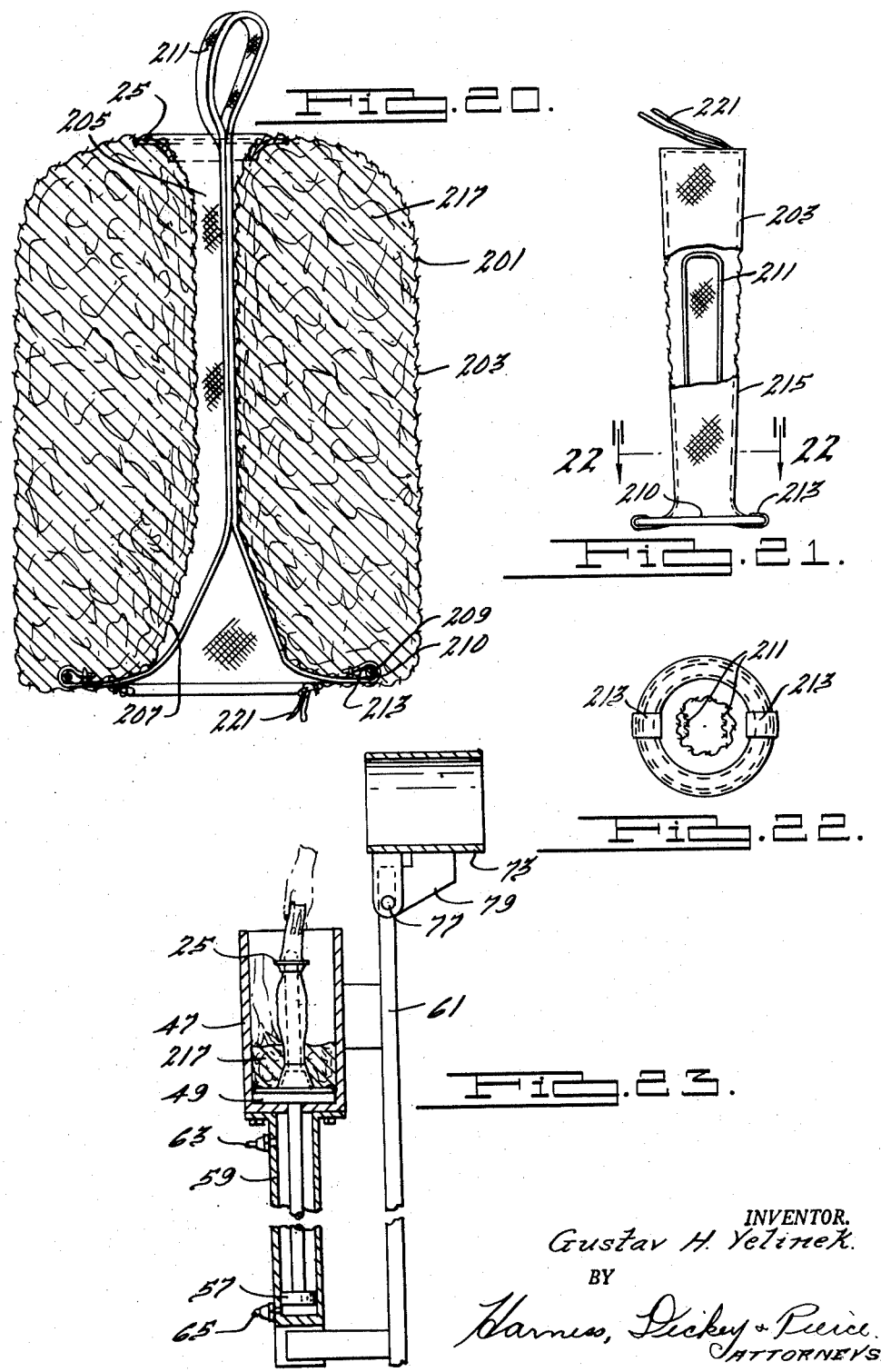
INVENTOR.
Gustav H. Yelinek.
BY
Harness, Dickey & Pierce
ATTORNEYS.

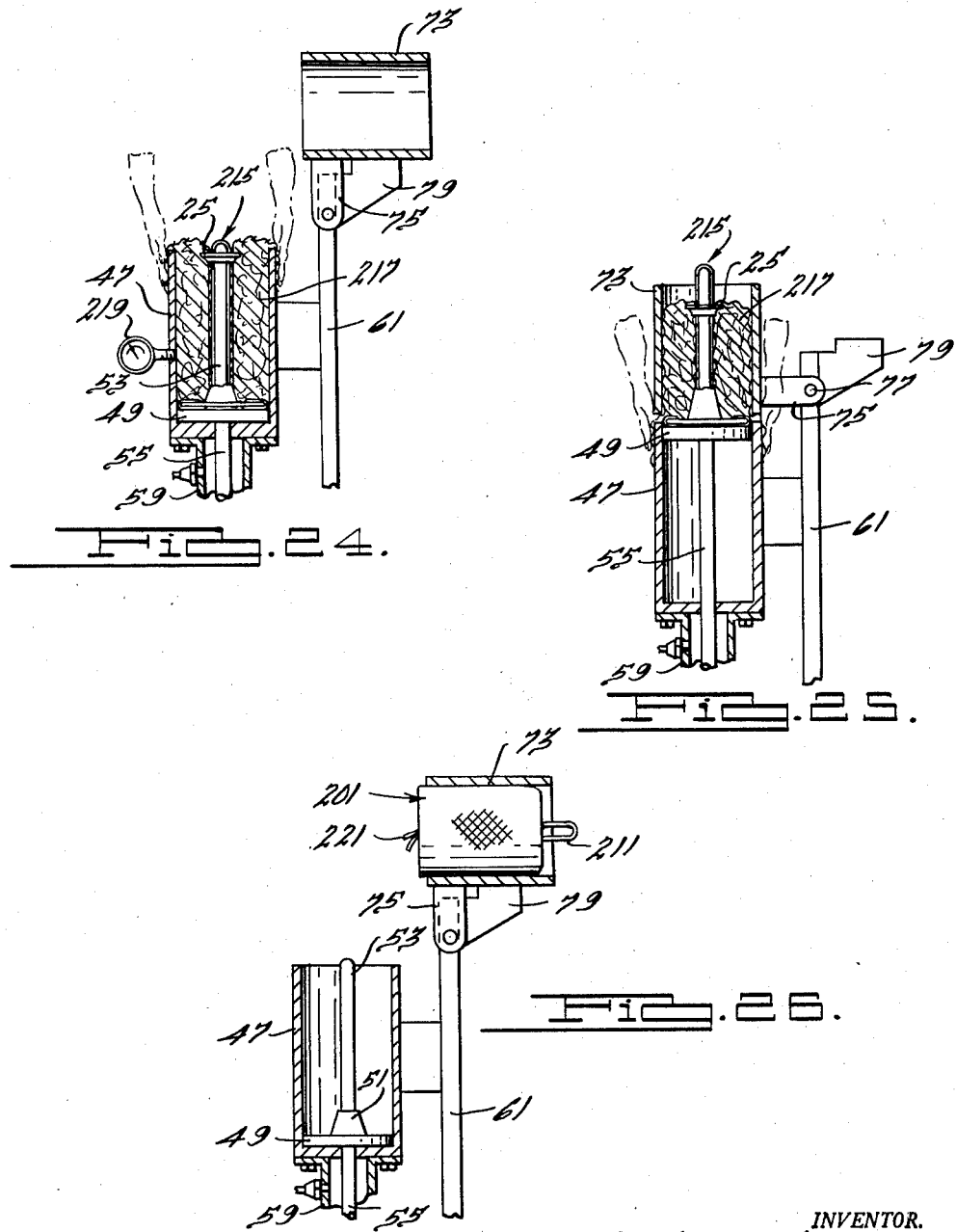

United States Patent Office 2,910,814
Patented Nov. 3, 1959

2,910,814

METHOD OF MANUFACTURE OF FILTER MECHANISM

Gustav H. Yelinek, La Porte, Ind., assignor to Deluxe Products Corporation, La Porte, Ind., a corporation of Indiana Application August 12, 1952, Serial No. 303,859

6 Claims. (Cl. 53—13)

My invention concerns filter cartridges of a type that is particularly suited for use in oil filters but which may be used in filtering practically all liquids of proper viscosity, such as gasoline, naphthas, cooking fats, wine, etc. It relates to an improved filter cartridge construction, to an improved method of manufacturing filter cartridges, and to improved apparatus for manufacturing filter cartridges.

An object of my invention is to provide a filter cartridge having improved operating characteristics.

Another object is to reduce the cost of manufacture of filter cartridges.

Still another object is to provide a filter construction and method of manufacture which will simplify and facilitate the production of filter cartridges.

It is also an object of the invention to provide apparatus for carrying out the manufacture of my filter cartridge.

In the filter cartridge of my invention I use absorbent and adsorbent filtering material that is confined in a state of axial and radial compression by a suitable container, preferably a flexible sock such as is commonly used in the oil filter cartridge art. I prefer to use a mixture of redwood bark and raw cotton as the filtering material, the redwood bark acting as resilient means to prevent compacting of the cotton. I form my filter by placing the mass of filter material around the sock, which serves as a core, and then turning one end of the sock inside out and forcing the filter material into the turned-over portion of the sock during which operation the filter material is substantially reduced in length. I find it convenient to conduct this operation in a mold which, for certain types of cartridges, may contain a core to form an aperture in the completed filter cartridge. The preferred type of filter material molds very well and this characteristic, plus the use of a fabric sock which is stressed in tension, results in very satisfactory maintenance by the cartridge of its molded shape. The cartridge may be formed from loose filter material by a ram-pack method; or it may be formed by rolling up relatively long strips of filter material about the sock as a core and then inserting them into the mold for subsequent reduction in length. My filter cartridge constructions contain novel features which enable the sock and a base section to be formed as a subassembly. The base section may be used to provide a convenient anchor for one end of the sock in the filter material. It may also be used as an anchor for a suitable handle whereby the cartridge may be readily handled and removed from the oil filter proper.

Various other objects and features of the invention will become apparent upon consideration of the accompanying drawings in which:

Figure 1 is a side elevation partly in section of a subassembly of the improved sock-type oil filter cartridge prior to addition of the filtering material;

Fig. 2 is a section taken along the line 2—2 of Fig. 1;

Fig. 3 is a section taken along the line 3—3 of Fig. 2 and shows details of the base plate assembly;

Fig. 4 is a diagrammatic side elevation of the filter material ready for assembly with the subassembly of Fig. 1;

Fig. 5 is a plan view of the structure shown in Fig. 4 and shows the subassembly of Fig. 1 in position on the filter material immediately prior to the beginning of assembly;

Fig. 6 is a section taken along the line 6—6 of Fig. 5 and shows a cross section of the strip of filter material prior to assembly;

Fig. 7 is a perspective view showing the initial assembly condition of the filter material and the subassembly of Figure 1;

Fig. 8 is a side elevation partly in section showing a first step in compressing the filtering material;

Fig. 9 is a view similar to Fig. 8 showing a more advanced stage in the compression of the filter material and the manufacture of the completed filter cartridge;

Fig. 10 is a view similar to Figs. 8 and 9 showing a still more advanced stage in the manufactue of the filter cartridge and revealing the filter material in substantially fully compressed condition;

Fig. 11 is a view similar to Figs. 8–10 showing the filter cartridge at completion of manufacture and assembly;

Fig. 12 is a view taken along the line 12—12 of Figure 11 and shows the base end of the oil filter;

Fig. 13 is a cross section through the oil filter that has been manufactured from the structure and equipment shown in the preceding figures;

Fig. 14 is a side elevation of a modified form of oil filter cartridge subassembly, this figure being similar to Fig. 1;

Fig. 15 is a section taken along the line 15—15 of Fig. 14 and corresponding to Fig. 2;

Fig. 16 is a section taken along the line 16—16 of Fig. 15 and corresponds to Fig. 3;

Fig. 17 is a plan view similar to Fig. 5 showing the subassembly of Fig. 15 ready to be assembled with the strip of filter material;

Fig. 18 is a view similar to Fig. 9 showing a step in the assembly and compression of the filter material and the subassembly of Fig. 14;

Fig. 19 is a view similar to Fig. 10 showing the filter material in substantially fully compressed condition;

Fig. 20 is a cross section through a third type of oil filter cartridge;

Fig. 21 is a side elevation similar to Figs. 1 and 14 of a subassembly used in the manufacture of the filter cartridge of Fig. 20;

Fig. 22 is a cross section taken along the line 22—22 of Fig. 21;

Fig. 23 is a cross section through apparatus similar to that shown in Figs. 9 and 18 only arranged in a vertical position and which may be used to ram-pack the filter material around the subassembly of Fig. 21 to form the oil filter cartridge of Fig. 20;

Fig. 24 is a view similar to Fig. 23 showing the next step in the manufacture of the filter cartridge of Fig. 20;

Fig. 25 is a view similar to Figs. 10 and 19, showing the filter material in substantially fully compressed condition; and Fig. 26 is a view similar to Fig. 11 showing the completed filter cartridge ready for removal from the assembly apparatus.

Referring first to the oil filter cartridge 1 shown in Fig. 13 and its details and method of manufacture as shown in Figs. 1–12, the cartridge 1 has a mass of filtering material 3 which is enclosed and held in a predetermined shape by a flexible container, preferably a porous fabric 5 commonly known as a cartridge "sock." The bottom or base (and inlet end) of the cartridge is provided by an annular plate 7 which has annular inner and outer flanges 9 and 11. The inner flange 9 defines a central opening at the bottom of the cartridge and additional openings in the bottom of the cartridge may be provided by apertures 13. The inner flange 9 is turned radially inwardly to form an annular radial flange 15. Mating with the flanges 15 and 9 is an annular seal ring 17 which is used to clamp one end of the sock 5 against the flanges on the bottom plate as best shown in Figures 3 and 13. The seal 17 is formed of soft metal and is dimensioned so that it has a press fit on the flange 9 when forced over it and the end of the sock. The looped wire handle 19 has its ends extending through aligned apertures in the seal ring 17 and the flange 9 whereby the wire handle, like the sock 5, is anchored to the base plate 7 and whereby it may also serve to hold the seal ring in place.

The sock 5 extends away from its anchor on the base plate 7 and up through the center of the filter cartridge and defines the side wall of the central aperture 21 that extends from end to end of the filter element. By means to be detailed hereinafter, the lower end of the aperture 21 is formed in the shape of a cone 23 to provide the desirable operating characteristics referred to in Hurn Patent No. 2,168,124, the present filter cartridges being able to replace the patented cartridges in the various oil filter constructions. A top seal ring 25 is located inside of the sock at the top end of the aperture 21 and serves to positively maintain the opening. It is apparent that the sock 5 will permit a certain amount of expansion and contraction in the diameter of the aperture 21 and that this aperture is therefore adapted to tightly grip the standpipe (not shown) of the oil filter unit proper (not shown) in which the cartridge is inserted. The sock 5 is turned inside out or outwardly back upon itself over the mass of filter material 3 and defines the outer enclosing surface of the cartridge. The free end of the sock has a draw cord or shirr string 27 disposed therein so that when the free end of the sock 5 is turned over against the back of the base plate 7, as shown in Figs. 12 and 13, the draw cord 27 may be tied to secure the sock firmly in place.

Turning now to the method of manufacturing the oil filter 1, it will be seen from Figures 1–3 that all of the parts except the filter material 3 and the seal 25 can be united together in a convenient subassembly identified by the reference numeral 29, the seal ring 25 being shown in Fig. 1 merely to illustrate its association with sock 5. The subassembly 29 can be readily made up from its detail parts and is ideally suited for manufacture at a separate point or location from which it can be shipped or delivered to the place where the actual completed cartridges 1 are manufactured and shipped.

The filter material 3, in this form of the invention, comes in a batt or strip 31 that is spirally wrapped up into a roll 33 which is rotatably supported by a core 35 journaled in the trunnions 37 on a table 39, the surface 41 of which is located at a convenient working height. The filter material which I presently prefer to use is a mixture of redwood bark and virgin or raw cotton, the cotton preferably being around 60% and the bark 40%, this material being available in batt form on the open market. The redwood particles and cotton fibers are randomly but uniformly disposed through the batt, the cotton fibers being similar in shape and arrangement to those found in conventional cotton insulation or household cotton batting. The redwood bark particles seem to act like tiny springs and prevent harmful compacting of the filter material during actual use and also act as strainers to catch impurities. I presently prefer to use a batt which is roughly a quarter of an inch thick and folded over upon itself as shown in Fig. 6 so that in coming from the roll 33 it forms a strip which is roughly a half of an inch thick. The width of the batt 31 is preferably about the same as the relaxed length of the sock 5 (Fig. 5) and this is preferably about twice the length of the completed cartridges. The batt 31 is spread along the table surface 41 and length indicators (not shown) may be provided so that the lengths used in successive cartridges are consistent within required limits. In actual practice the worker quickly acquires skill in determining how much he must roll up the strip 31 and subassembly 29 in order to have the right quantity of filter material. The material 31 is very soft and the proper length can be easily severed from the remainder of the strip 31 by merely pulling the two sections apart. This has the advantage of forming a feather edge which blends into the bulk of the material during subsequent manufacturing operations so that a relatively uniform diameter and compression are obtained.

After the roll-up of subassembly 29 and filter material 31 as shown in Figs. 5 and 7, the assembly 45, so formed, may be handed to another operator for insertion into one end of a molding and compression apparatus as shown in Fig. 8. This includes cylinder 47 that has a piston 49 working in it. The piston is provided with a core pin in the form of a conical projection 51 and an extended rod-like projection 53, it being apparent that the projections 51 and 53 are intended to mold the cone 23 and the aperture 21 in the filter. The piston 49 and its attached projections are secured to the rod 55 of piston 57 which works in a pressure cylinder 59. The cylinders 47 and 59 are supported at a convenient working height by a suitable stand or frame 61. Pressure fluid, preferably air, is supplied to the cylinder 59 on opposite sides of the piston 57, through conduits 63 and 65 and the flow of pressure fluid in the conduits is controlled by suitable valve mechanism 67. The mechanism 67 is preferably biased to retract piston 57 as shown in Fig. 8, and operated by depression of foot pedal 69 to cause the piston to advance or move to the right. An adjustable stop such as screw and nut assembly 70 may be threaded into the end of cylinder 59 to provide means for adjusting the retracted positions of the pistons 57 and 49. Obviously, purely mechanical or other means can be used to operate the piston 49.

The worker takes the assembly 45 and inserts it into the cylinder 47 with the base 7 first and with the piston 49 retracted as shown in Fig. 8. The length of the free space which the assembly 45 can occupy within the cylinder is preferably no more than about ¾ of the length of the assembly 45. The preferred filter material is very light and porous and the operator can readily shorten it in length so as to compress substantially all of it into the cylinder. In doing this he first places the seal ring 25 over the free end of the sock 5 as illustrated in Fig. 8. When he has substantially completely pressed the material into the cylinder 47, he stretches the sock 5 and turns it outwardly and backwardly over the outside of the cylinder 47 as shown at 71 in Figure 9. It will be seen that the sock thus confines the filter material 3 inside of the cylinder 47. The reduction in length results in axial compression of the material 3 and since it cannot expand appreciably in diameter it is also radially compressed. This compression causes it to assume the shape of the free space within the cylinder 47; that is, it is pressed against projections 51 and 53 to be provided with the cone 23 and the aperture 21. The preferred type of filter material 3 molds rather well and furthermore is held to some extent in its molded position by the sock 5 so that upon its eventual removal from the cylinder 47 it maintains its shape to a satisfactory degree, as illustrated in Figure 13.

After the operator has forced the material 3 into the cylinder 47 and spread the sock 5 over the outside of the cylinder, he lifts the sleeve 73 into a position of alignment with the cylinder 47. The sleeve 73 is of the same internal diameter as the cylinder 47 but may be of less length and it is pivoted by a rigid arm 75 on a pin 77 to the frame 61. A rigid stop 79 may be used to determine the lowered position of the sleeve 73. When the sleeve 73 is in alignment with the cylinder 47, the operator depresses pedal 69 and actuates the control mechanism 67 to furnish pressure fluid to the back side or left-hand side of the piston 57. This drives the piston 49 outwardly and to the right so that the contents of the cylinder 47 are forced into the sleeve 73. While this is taking place, the operator maintains his grip on the end of the sock 5 as will be seen in Fig. 10. This stretches the sock 5 and at the same time causes the filter material 3 to compress still further, roughly an additional 25%. This compression of the material is controlled by the operator by means of the sock 5 as well as by his control over mechanism 67. He continues ejection until all of the material is in the sleeve 73 and there is a short length of sock 5 to be turned radially across the base 7. When this length of sock is available, he turns the sleeve 73 back to its inoperative position as shown in Fig. 11 and ties the draw string 27, thus completing assembly of the cartridge 1.

Figures 14–19 illustrate a method of manufacturing a filter cartridge which is fundamentally similar to the cartridge 1 but which has no aperture 21 or cone 23. In other words, it is a solid cartridge and can be used in a filter construction such as shown in Burhans 1,910,747. This filter cartridge may be made by placing the subassembly 101 on the strip 31 of filter material and rolling it up as already described. The initial assembly of filter material 31 and subassembly 101 is then inserted into the cylinder 47 as shown in Fig. 18 and the steps described above are repeated as indicated by Fig. 19. It will be observed in Figs. 18 and 19 that the conical projection 51 and the rod 53 have been removed from the piston 49 inasmuch as this cartridge is solid. Obviously, the cone 51 and the rod 53 can be formed as a solid adapter piece that can be threaded or otherwise removably secured to the face of the piston 49 whereby the same equipment can be used to manufacture either type of filter cartridge.

The subassembly 101, like the subassembly 29, may be conveniently formed at a location other than the location for the operations shown in Figs. 17–19. The subassembly 101 has a base plate 103 which is provided with a number of oil inlet (or outlet) apertures 105. The wire handle 107 may be looped around a section of the base plate 103 by passage through certain of the apertures 105 and then the ends twisted together as shown at 109. The sock 111 may be formed of the same fabric as the sock 5, or of other suitable material, and it is anchored to the shank of the wire handle 107 by a staple 113. The sock 111 has draw strings 115 in one end so that the free end of the sock can be turned over the back side of the base plate 103 and tied there in the same manner as illustrated in Figures 11 and 12, the completed structure of the cartridge being obvious from consideration of Fig. 19.

Figs. 20–26 illustrate a modified form of oil filter cartridge 201 and its method of manufacture. The cartridge 201 is essentially similar to cartridge 1, and has a sock 203 that extends around the outside thereof and down through the central aperture 205 and bottom cone 207. However, in the filter 201 the metal base plate 7 has been eliminated and it is replaced by a simple metal ring 209. The end of the sock 203 is looped around the ring 209 at 210 and then sewed together so that the ring is within the sock. A handle tape 211 may have its ends sewed into this joint at the end of the sock as shown at 213. The ring 209 is slightly less in diameter than the final O.D. of the filter cartridge as seen in Fig. 20. The ring 25, inside of sock 203, maintains a suitable opening at the top of aperture 205.

In manufacturing this filter cartridge, the sock 203 along with the tape 211 or any other suitable servicing handle and ring 209 may be conveniently purchased or manufactured elsewhere as the subassembly 215 shown in Fig. 21. This subassembly is united with the filter material 217 by a ram-pack method rather than the roll-up method illustrated in the preceding modifications. To facilitate this, the cylinder 47 is disposed vertically as shown in Fig. 23 and the subassembly 215 placed therein with the ring resting on the piston 49 and the latter in its fully retracted position. Loose or bulk filter material 217 (preferably cotton and redwood bark as before) may then be rammed by hand around the outside of the sock 203 and in the cylinder 47. If desired, a pressure gauge of a suitable type 219 may be connected on the side of the cylinder 47 to indicate the extent to which the filter material is compressed. It will be evident that by controlling the bulk or the weight of the material rammed into the cylinder or by controlling its rammed pressure, uniformity can be obtained among successive filter cartridges.

After the cylinder 47 has been filled, the free end of the sock 203 is turned down over the outside of the cylinder 47 (Fig. 24) and the sleeve 73 moved into alignment with the cylinder 47. The piston 49 is then actuated to force the contents of the cylinder 47 into the sleeve 73 (Fig. 25) and the end of the sock is turned over the bottom end of the filter and the draw string 221 tied (Fig. 26) in the same manner as already described.

It will now be apparent that the invention provides an improved filter cartridge that may also be economically manufactured. Various modifications of the construction, method, and apparatus illustrated may, of course, be made without departing from the spirit and scope of the invention.

I claim:

1. The method of manufacturing a filter cartridge which comprises the steps of rolling up a strip of filter material about a fabric sock as a core and axis, said strip being about as wide as the socket is long, substantially reducing the axial dimension of said filter material without substantially increasing its transverse dimension, turning one end of said sock radially outwardly and then rearwardly over the outside of said material, and securing the turned over end of the sock in place with respect to said material at the end of said material opposite said turned over end.

2. The method of forming a filter cartridge which comprises the steps of placing a mass of filter material about a fabric sock as a core and axis, substantially reducing the axial length of said mass while confining it against radial expansion, turning one end of said sock inside out and over the outer periphery of said mass and forcing the filter material into and against resistance of force applied to the turned over sock so as to further reduce the axial length of the mass by about 25%, and anchoring the turned over end of the sock to the mass so that said sock serves as a flexible container for the mass.

3. The method of forming an annular filter cartridge comprising placing a fabric sock over a core pin and a mass of filter material around the sock, said core pin defining the axis of the filter and serving to shape the inner periphery of the cartridge, reducing the axial length of said material while preventing substantial transverse enlargement so that the material and said sock are forced against said core pin, turning the sock inside out over the outer periphery of the material and forcing the filter material into the sock while confining the sock against radial expansion and applying force to it to resist entry of the mass and thereby compress the mass, and withdrawing the core pin and anchoring the turned over end of the sock to the material.

4. The method set forth in claim 3 wherein said sock is substantially stretched and tensioned and thus serves to yieldably maintain the cored shape of the material after removal of the core pin.

5. The method of manufacturing a filter cartridge which comprises the steps of wrapping a strip of filter material around a fabric sock as a core, inserting said wrapped up strip and sock into the open end of a closed wall mold with one end of the sock extending out of said open end, turning said one end of the sock outwardly and rearwardly over the outside of the mold, forcing the material in one direction out of the mold through said open end and simultaneously yieldably resisting such ejection of the material from the mold by applying force to said sock in the other direction and thereby reducing the axial length of said mass, continuing ejection of said material from said mold until it has all been forced into the turned over end of the sock, and anchoring said turned over end in place with respect to the material.

6. The method of manufacturing a filter cartridge which comprises the steps of ram packing filter material in a mold about a fabric sock as a core, said mold having closed walls but being open at one end, turning one end of the sock over the outside of the mold around said open end, positioning a second mold in alignment with said open end, forcing the material through said one end into the sock and into said second mold against the resistance of the sock whereby the filter material is compressed, and anchoring the sock to the material while in said second mold.

References Cited in the file of this patent

UNITED STATES PATENTS

| | | |
|---|---|---|
| 2,141,144 | Warner | Dec. 20, 1938 |
| 2,168,124 | Hurn | Aug. 1, 1939 |
| 2,209,180 | Von Pentz | July 23, 1940 |
| 2,314,640 | Winslow et al. | Mar. 23, 1943 |
| 2,331,856 | Pearson | Oct. 12, 1943 |
| 2,334,664 | Wicks | Nov. 16, 1943 |
| 2,418,657 | Moritz | Apr. 8, 1947 |
| 2,517,704 | Overbeke | Aug. 8, 1950 |
| 2,521,833 | Dahl | Sept. 12, 1950 |
| 2,540,272 | Malmstrom et al. | Feb. 6, 1951 |
| 2,550,070 | La Breque et al. | Apr. 24, 1951 |
| 2,584,771 | Wilkinson | Feb. 5, 1952 |
| 2,593,227 | Wagner | Apr. 15, 1952 |